(12) United States Patent
Plotkin et al.

(10) Patent No.: US 8,733,340 B2
(45) Date of Patent: May 27, 2014

(54) ARRANGEMENT OF TUBING IN SOLAR BOILER PANELS

(75) Inventors: Andrew Plotkin, Worcester, MA (US); Kevin Toupin, Princeton, MA (US); Russell Ricci, Brookfield, MA (US)

(73) Assignee: Babcock Power Services, Inc., Worcester, MA (US)

( * ) Notice: Subject to any disclaimer, the term of this patent is extended or adjusted under 35 U.S.C. 154(b) by 0 days.

(21) Appl. No.: 13/584,888

(22) Filed: Aug. 14, 2012

(65) Prior Publication Data

US 2012/0304982 A1 Dec. 6, 2012

Related U.S. Application Data

(63) Continuation of application No. 12/552,724, filed on Sep. 2, 2009, now Pat. No. 8,316,843.

(60) Provisional application No. 61/151,984, filed on Feb. 12, 2009, provisional application No. 61/152,114, filed on Feb. 12, 2009, provisional application No. 61/152,077, filed on Feb. 12, 2009, provisional application No. 61/152,049, filed on Feb. 12, 2009, provisional application No. 61/152,035, filed on Feb. 12, 2009, provisional application No. 61/152,011, filed on Feb. 12, 2009, provisional application No. 61/152,286, filed on Feb. 13, 2009.

(51) Int. Cl.
*F24J 2/24* (2006.01)

(52) U.S. Cl.
USPC ............ 126/704; 126/651; 126/655; 126/663

(58) Field of Classification Search
USPC ................. 126/704, 651, 655, 674, 706, 663; 165/67, 81, 82, 83
See application file for complete search history.

(56) References Cited

U.S. PATENT DOCUMENTS

| 2,383,234 A | 8/1945 | Barnes |
| 3,197,343 A | 7/1965 | Palmatier |

(Continued)

FOREIGN PATENT DOCUMENTS

| FR | 2501839 A1 | 9/1982 |
| JP | 53131309 A | 11/1978 |

(Continued)

OTHER PUBLICATIONS

International Search Report, dated Nov. 23, 2013 for PCT/US2012/035833.

(Continued)

*Primary Examiner* — Alfred Basichas
(74) *Attorney, Agent, or Firm* — Edwards Wildman Palmer LLP; Alicia J. Esposito; Joshua L. Jones

(57) ABSTRACT

A boiler for a solar receiver includes a first boiler panel having a plurality of tubes fluidly connecting an inlet header of the first boiler panel to an outlet header of the first boiler panel. The tubes of the first boiler panel form a first solar receiver surface. A second boiler panel has a plurality of tubes fluidly connecting an inlet header of the second boiler panel to an outlet header of the second boiler panel. The tubes of the second boiler panel form a second solar receiver surface. The first and second boiler panels are adjacent to one another with a portion of the first boiler panel and an end of the first solar receiver surface overlapping an end of the second boiler panel to reduce solar radiation passing between the first and second solar receiver surfaces.

14 Claims, 6 Drawing Sheets

(56) References Cited

U.S. PATENT DOCUMENTS

| | | |
|---|---|---|
| 3,208,877 A | 9/1965 | Merry |
| 3,325,312 A | 6/1967 | Sonntag, Jr. |
| 3,450,192 A | 6/1969 | Hay |
| 3,459,597 A | 8/1969 | Baron |
| 3,464,402 A | 9/1969 | Collura |
| 3,822,692 A | 7/1974 | Demarest |
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A | 9/1981 | Zadiraka |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A | 12/1984 | Wiener |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0250051 A1 | 10/2009 | Lata Perez |
| 2009/0260359 A1 | 10/2009 | Palkes |
| 2009/0276993 A1 | 11/2009 | Fedock et al. |
| 2010/0199978 A1 | 8/2010 | Plotkin et al. |
| 2010/0229853 A1 | 9/2010 | Vandal et al. |
| 2010/0236183 A1 | 9/2010 | Cusson et al. |

(56) References Cited

U.S. PATENT DOCUMENTS

2010/0258112 A1  10/2010  Viskup, Jr. et al.
2011/0079217 A1   4/2011  Ricci et al.

FOREIGN PATENT DOCUMENTS

| JP | 08326223 A | 12/1996 |
| KR | 20100033178 A | 3/2010 |
| WO | WO-2008154599 A1 | 12/2008 |

OTHER PUBLICATIONS

U.S. Appl. No. 60/943,096, Kroizer.

International Search Report and Written Opinion, dated Aug. 30, 2010 for PCT/US2010/023124.
International Search Report and Written Opinion, dated Aug. 31, 2010 for PCT/US2010/023165.
International Search Report and Written Opinion, dated Oct. 13, 2010 for PCT/US2010/023622.
International Search Report and Written Opinion, dated Oct. 13, 2010 for PCT/US2010/023826.
International Search Report and Written Opinion, dated Dec. 13, 2010 for PCT/US2010/023367.
International Search Report and Written Opinion, dated Dec. 13, 2010 for PCT/US2010/023500.
Spanish Search Report dated Sep. 10, 2013 issued in Spanish Application No. 201190058.

ARRANGEMENT OF TUBING IN SOLAR BOILER PANELS

CROSS-REFERENCE TO RELATED APPLICATIONS

This application is a continuation application of U.S. patent application Ser. No. 12/552,724 filed on Sep. 2, 2009, which claims priority to U.S. Provisional application No. 61/151,984, filed Feb. 12, 2009, to U.S. Provisional application No. 61/152,011, filed Feb. 12, 2009, to U.S. Provisional application No. 61/152,035, filed Feb. 12, 2009, to U.S. Provisional application No. 61/152,049, filed Feb. 12, 2009, to U.S. Provisional application No. 61/152,077, filed Feb. 12, 2009, to U.S. Provisional application No. 61/152,114, filed Feb. 12, 2009, and to U.S. Provisional application No. 61/152,286, filed Feb. 13, 2009, each of which is incorporated by reference herein in its entirety.

BACKGROUND OF THE INVENTION

1. Field of the Invention

The present invention relates to solar power production, and more particularly, to solar receiver panels for use in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar production can be increased and simplified by using water/steam as the only working fluid in a receiver that is a boiler. This can eliminate the need for an inefficient heat exchanger between two different working fluids. This development has lead to new challenges in handling the intense solar heat without damage to the system. Typical boilers include two or more sections at different temperatures and pressures, such as a section of steam generator panels, a section of superheater panels, and a section of reheater panels, for example. In a solar boiler, it is advantageous to have boiler sections close together within the receiver where the focused solar radiation provides heat. It has been known, for example, to have one section on top of another section. There is a gap between such adjacent sections, which accommodates headers and associated structures of the boiler sections and can provide room for thermal expansion and contraction of the boiler sections. The gap must be protected against the possibility of focused sunlight reaching components internal to the receiver panels (known as leakage), where the intense radiation can be harmful.

One approach to this problem has been to cover the gaps between boiler sections with a thermal barrier or shield, which blocks the sunlight from entering the gap. Such a thermal barrier occupies surface area in the key receiving area of the boiler and thus reduces the amount of useable solar radiation from the heliostats that is actually received by the boiler.

While the known systems of solar power production have generally been considered satisfactory for their intended purposes, there has remained a need in the art for solar receivers that can improve the useable receiving area while protecting internal spaces from leakage of solar radiation, allowing for thermal contraction and expansion, and providing for drainability. There also has remained a need in the art for such solar receivers that are easy to make and use. The present invention provides a solution to these problems.

SUMMARY OF THE INVENTION

The subject invention is directed to a new and useful boiler for a solar receiver. The boiler includes a first boiler panel having a plurality of tubes fluidly connecting an inlet header of the first boiler panel to an outlet header of the first boiler panel. The tubes of the first boiler panel form a first solar receiver surface and a first internal surface opposite the first solar receiver surface. A second boiler panel has a plurality of tubes fluidly connecting an inlet header of the second boiler panel to an outlet header of the second boiler panel. The tubes of the second boiler panel form a second solar receiver surface and a second internal surface opposite the second solar receiver surface. The first and second boiler panels are adjacent to one another with a portion of the first boiler panel and an end of the first solar receiver surface overlapping an end of the second boiler panel to reduce solar radiation passing between the first and second solar receiver surfaces.

In certain embodiments, the first and second boiler panels are adjacent to one another with an end of the first solar receiver surface overlapping an end of the second boiler panel so as to cover at least one of the headers behind the first solar receiver surface. It is also contemplated that an end of the first solar receiver surface can overlap an end of the second boiler panel so as to cover one of the headers of each boiler panel behind the first solar receiver surface.

The first and second internal surfaces can be covered with an insulation layer. A gap can be provided between the end of the second boiler panel and the portion of the first boiler panel overlapping the end of the second boiler panel to accommodate relative movement of the first and second boiler panels due to thermal growth, and the gap can be labyrinthine. The tubes of the first and second panels can be configured and adapted to be fully drainable by way of at least one header in each panel. It is also contemplated that the portion of the first solar receiver panel overlapping the end of the second boiler panel can include a 180° bend in the uppermost end of the plurality of tubes of the first solar receiving panel.

The invention also includes a boiler for a solar receiver including steam generator, superheater, and reheater panels, each having a plurality of tubes fluidly connecting a respective inlet header and a respective outlet header. The tubes of each panel form a solar receiver surface and opposed internal surface. The steam generator and superheater panels are adjacent one another with a portion of the steam generator panel and an end of the solar receiver surface thereof overlapping an end of the superheater panel to reduce solar radiation passing between the solar receiver surfaces of the steam generator and superheater panels. The steam generator and reheater panels are adjacent one another with a portion of the reheater panel including an end of the solar receiver surface thereof overlapping an end of the steam generator panel to reduce solar radiation passing between the solar receiver surfaces of the steam generator and reheater panels.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 2:
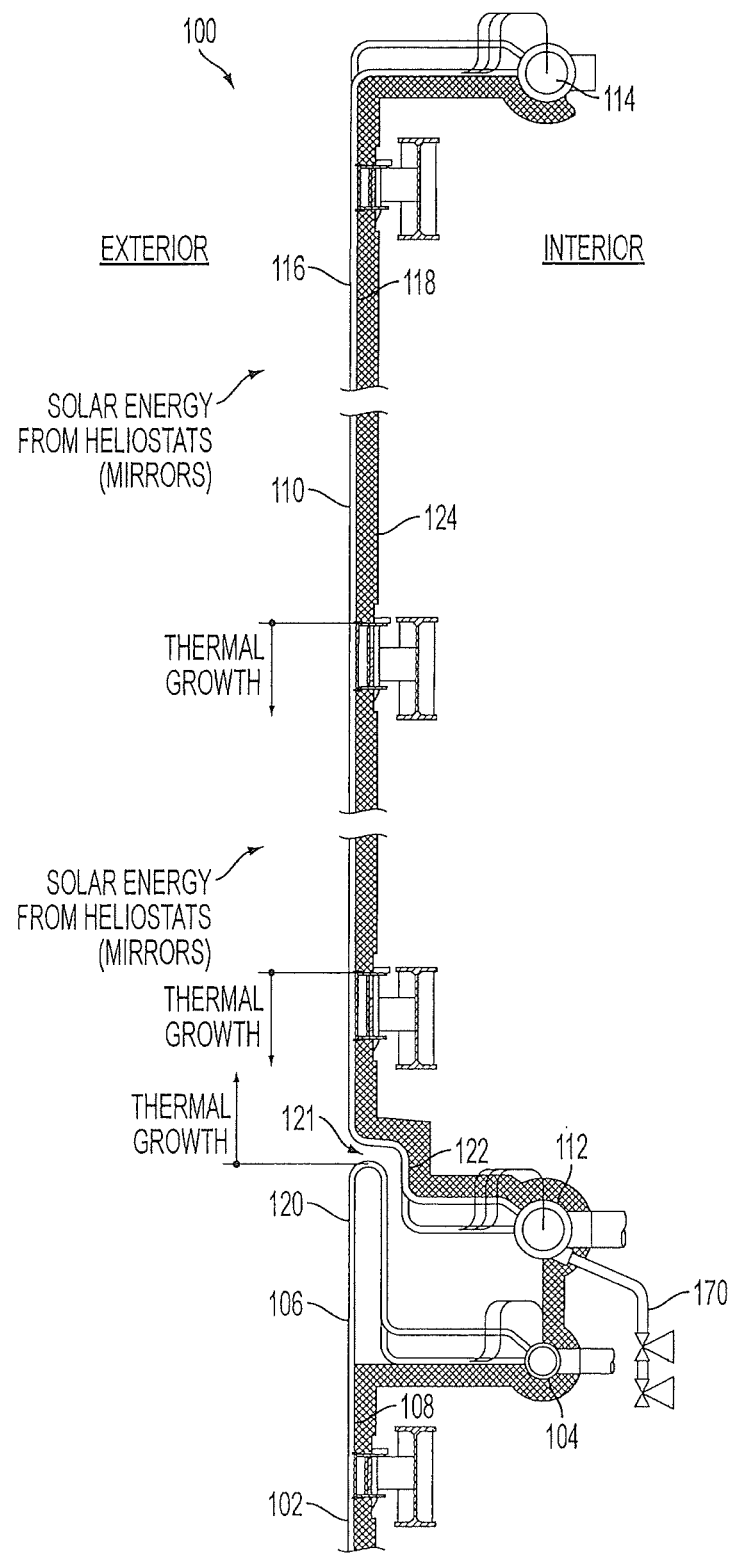
FIG. 2 is a side elevation view of a portion of an exemplary embodiment of a boiler constructed in accordance with the present invention, showing the overlap region between two receiver surfaces.

Reference will now be made to the drawings wherein like reference numerals identify similar structural features or aspects of the subject invention. For purposes of explanation and illustration, and not limitation, a partial view of an exemplary embodiment of a boiler constructed in accordance with the invention is shown in FIG. 2 and is designated generally by reference character 100. Other embodiments of a boiler in accordance with the invention, or aspects thereof, are provided in FIGS. 3-5, as will be described. The systems of the invention can be used to increase the effective receiving area while protecting internal spaces and components in boilers, for example in solar power generation.

Figure 1:
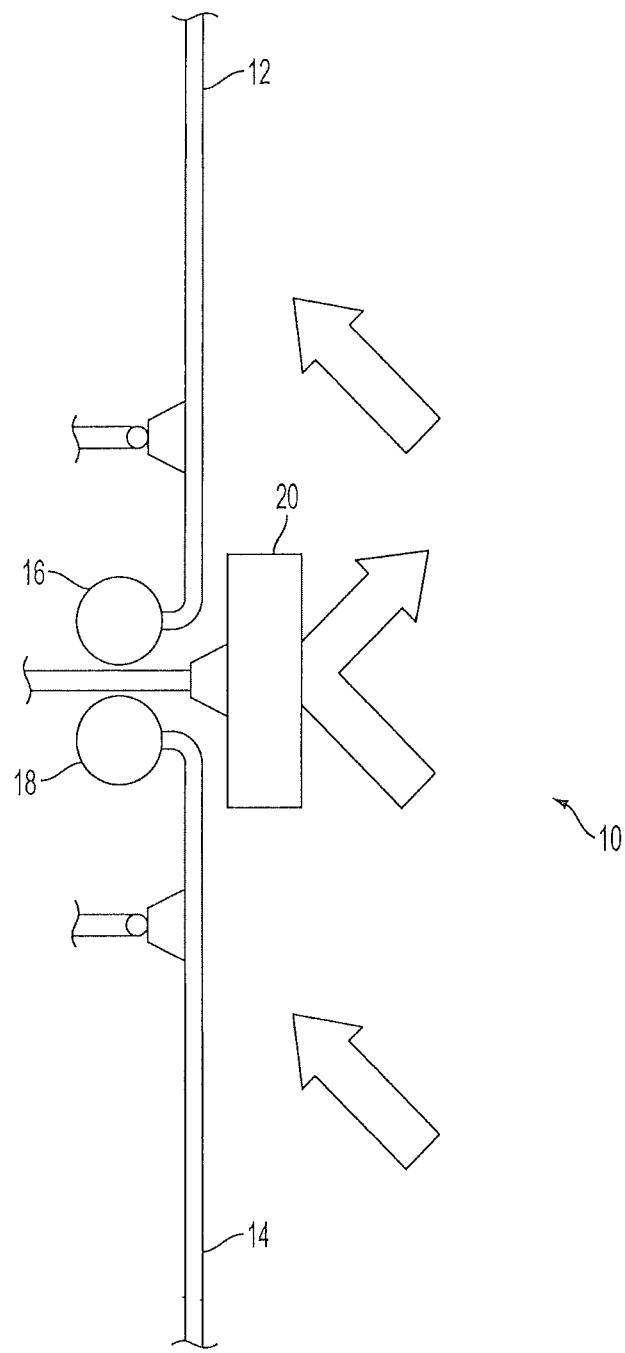
FIG. 1 a is side elevation view of a gap between boiler sections in a typical prior art solar boiler.

Solar boilers are set up in such a way that there are at least two distinct tube sections: one is a steam generator section containing boiling water and one or more is a superheating section containing superheated steam. FIG. 1 shows an example of a solar boiler 10 having a steam generator section 14 and a superheater section 12. These sections receive solar energy on their exterior surface during operation, as indicated by straight arrows in FIG. 1. It is required that the tubing in these different sections of tubes be physically separated from one another, e.g., where the headers 16 and 18 of the respective sections 12 and 14 are located in FIG. 1. Previous designs have had the ends of adjacent areas, including adjacent headers, close together. But even the best designs leave a significant gap between the solar receiver surfaces of sections 12 and 14 that would allow direct solar radiation to leak between the two tube sections. Therefore, this gap area must be protected with a thermal barrier, such as barrier 20. As indicated in FIG. 1 by a bent arrow, barrier 20 protects the gap region by blocking the incident solar radiation. This protection comes at a cost, namely the waste of concentrated solar energy in the receiving area that is incident on barrier 20 instead of on a receiver surface of sections 12 and 14.

With reference to FIG. 2, there are shown features of a solar boiler 100 constructed in accordance with the present invention. Boiler 100 for a solar receiver includes a first boiler panel 102 having a plurality of tubes fluidly connecting an inlet header 113 of the first boiler panel (not shown in FIG. 2, but see, FIG. 5) to an outlet header 104 of first boiler panel 102. The tubes of first boiler panel 102 form a first solar receiver surface 106 and a first internal surface 108 opposite first solar receiver surface 106. The exterior receiver surface 106 receives solar energy, for example from a field of heliostats, as indicated by arrows in FIG. 2.

A second boiler panel 110 similarly includes a plurality of tubes fluidly connecting an inlet header 112 of second boiler panel 110 to an outlet header 114 of second boiler panel 110. The tubes of second boiler panel 110 form a second solar receiver surface 116 and a second internal surface 118 opposite second solar receiver surface 116 (i.e. exterior and interior surfaces, as indicated in FIG. 2). Like receiver surface 106, exterior receiver surface 116 receives solar energy, for example from a field of heliostats, as indicated by arrows in FIG. 2.

First and second boiler panels 102 and 110 are adjacent one another with an end portion 120 of first boiler panel 102 and the corresponding end portion of first solar receiver surface 106 overlapping an end 122 of second boiler panel 110 to reduce or prevent solar radiation passing in between the first and second solar receiver surfaces 106 and 116 into the interior space of boiler 100. Interior surfaces 108 and 118 have a layer of insulating material 124 to protect the interior space of boiler 100 and components therein from the high temperatures on the backside of the tubes.

Figure 3:
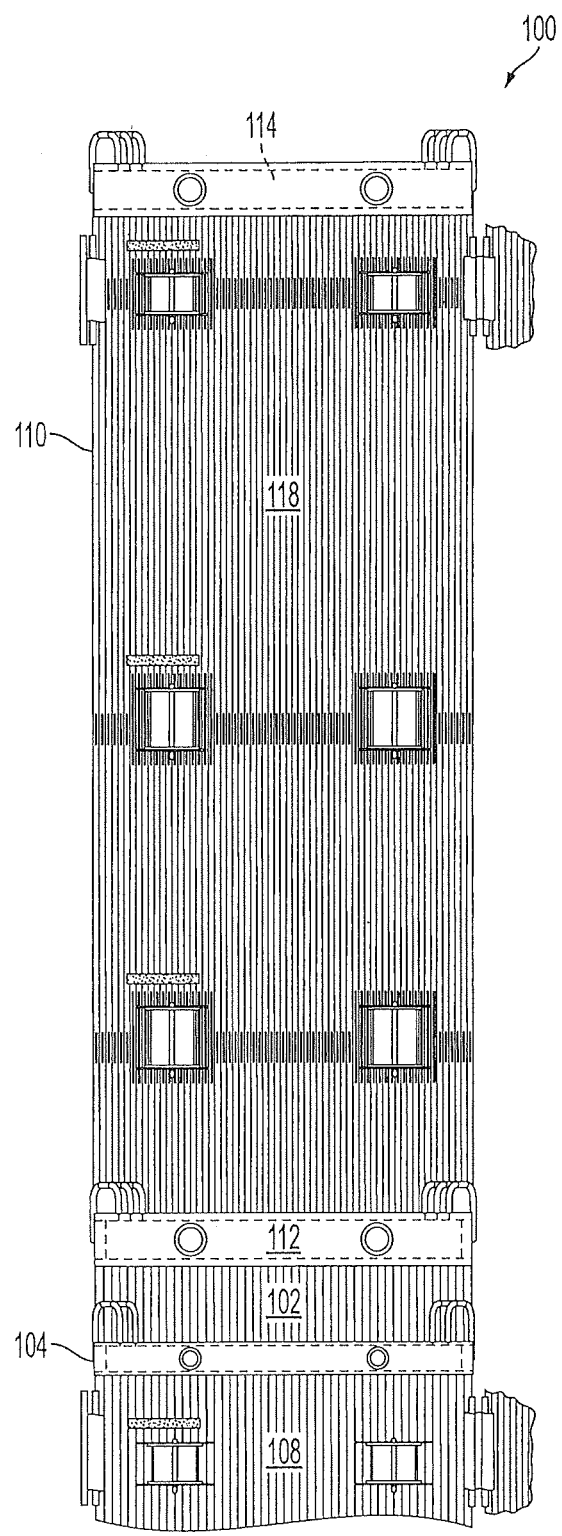
FIG. 3 is an interior elevation view of the portion of the boiler of FIG. 2, showing the headers and the interior surfaces of the tubes in the boiler panels.
Figure 4:
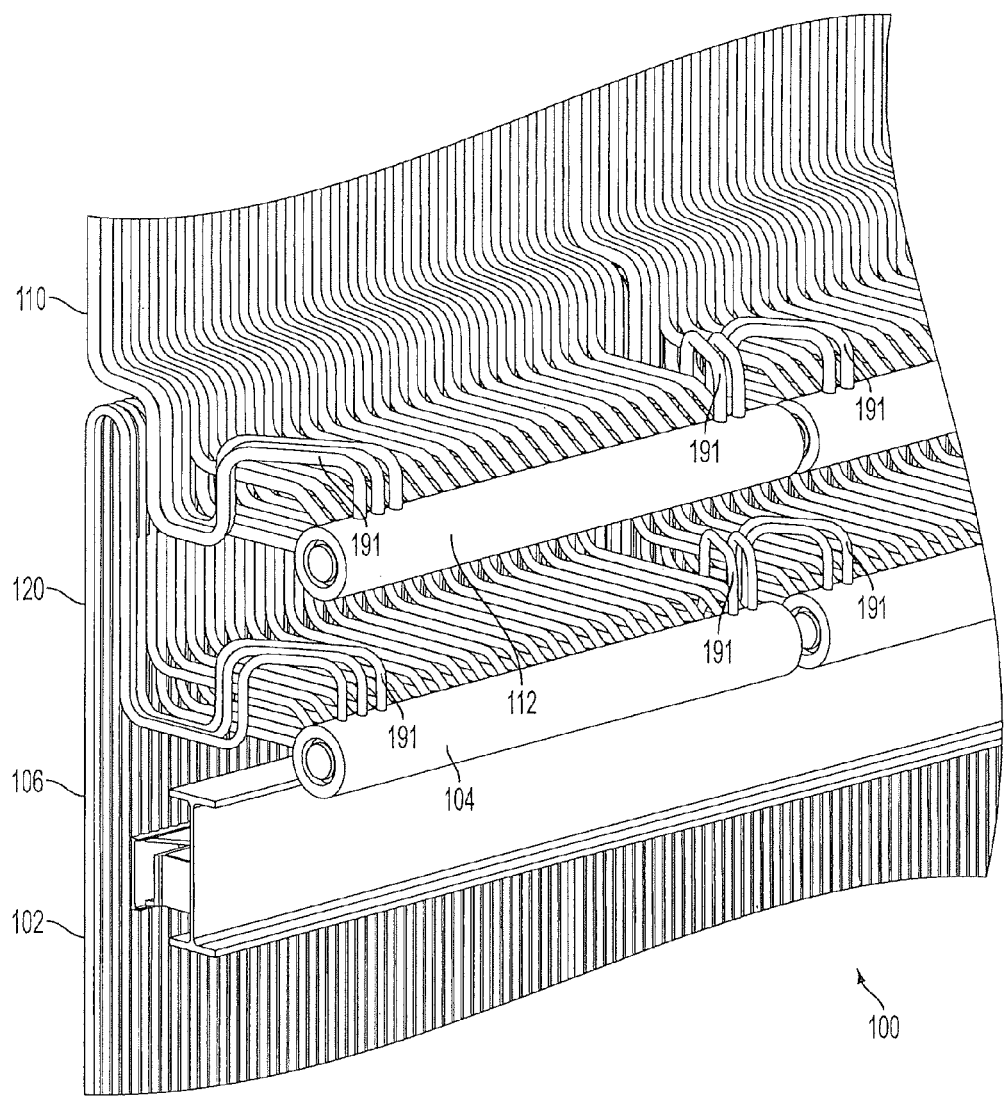
FIG. 4 is a perspective view of a portion of the boiler of FIG. 2, showing the overlap configuration of two adjacent boiler panels.

FIG. 3 shows the same portion of boiler 100 as in FIG. 2 but from the interior, with insulating material 124 removed to show the tubes and headers of panels 102 and 110. FIG. 4 shows a perspective view of the overlap region from the interior with the insulating material 124 removed as well. While the example described above includes shielding headers 112 and 104 shielded behind first receiver surface 106, those skilled in the art will readily appreciate that each panel can cover its own header, or any other suitable overlap configuration can be used without departing from the spirit and scope of the invention.

In this unique design, the tubes, which comprise the receiving surfaces 106 and 116, are overlapped in such a way that there is no need for a barrier to cover a gap between the receiving surfaces 106 and 116. This is accomplished by overlapping portions of the tubes of different boiler sections as described above. An overlapping tube design, in accordance with the present invention, prevents the need for wasteful insulation or shielding covering external portions of the receiver area of boiler 100. This also allows for a higher amount of absorption of solar radiation, which increases the overall efficiency of the system.

As indicated by arrows in FIG. 2, the overlap region between panels 102 and 110 allows for thermal expansion and contraction of the panels. There is a gap 121 between end portion 120 of boiler panel 102 and end portion 122 of boiler panel 110. As can be seen in FIG. 2, gap 121 is labyrinthine and thus any leakage of solar radiation is absorbed by the boiler tubes, e.g., in end portion 122, and is not allowed to penetrate the interior space of boiler 100. Since end 120 of first panel 102 and end 122 of second panel 110 spaced apart from one another, panels 102 and 110 can move relative to one another during the thermal expansion and contraction that results from the daily cycle of solar radiation incident on the receiver area of boiler 100. Thus, while gap 121 accommodates thermal expansion and contraction, in terms of leakage of solar radiation there is effectively no gap between panels 102 and 110.

If boiler panels are exposed to ambient conditions, it can be necessary to drain the water from the tubing after sunset to prevent damage from freezing water in the tubes. In tubes 102 and 110 this draining can be accomplished through drains 170, as indicated schematically in FIG. 2. The unique overlapping design of ends 120 and 122 allows the tubes of panels 102 and 110 to be completely drainable, as there is a header at each low point for each panel 102 and 110. The 180° bend in end 120 of first panel 102 does not trap water during draining, since water on both sides of the bend can flow downward to a drain or header. If, for example, if there were a 180° bend at the very bottom of a panel, it could trap water during draining and such a panel would not be fully drainable.

Figure 6:
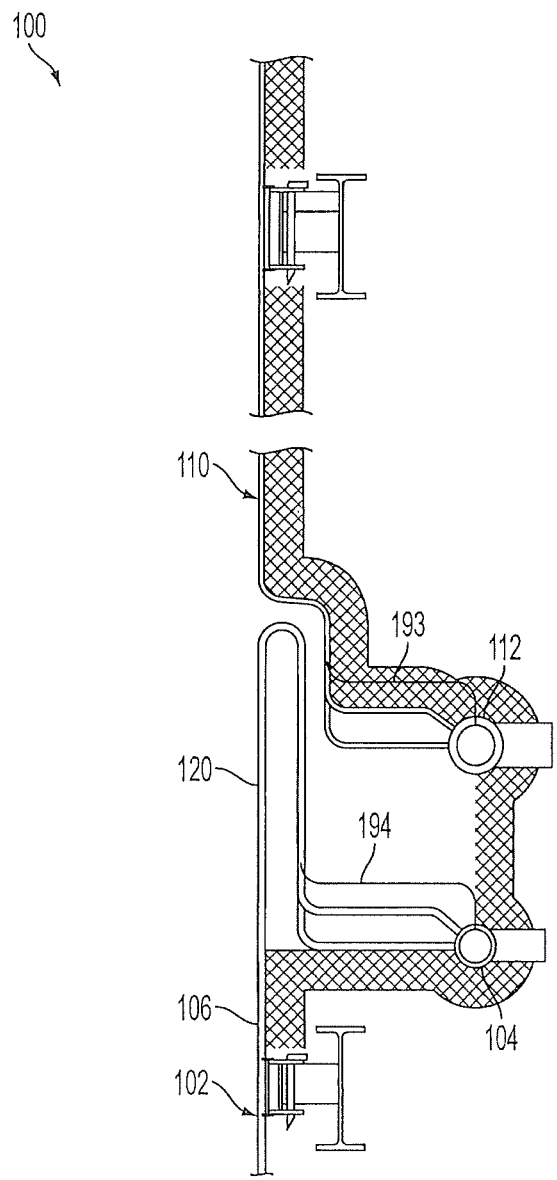
FIG. 6 is a side elevation view of a portion of the boiler of FIG. 2, showing another configuration for the end tubes of the panels.

As shown in FIG. 4, there are two or three end tubes 191 on each end of headers 112 and 104. End tubes 191 are bent inward to shorten the overall length of the respective headers 112 and 104. If it is desired to make end tubes 191 fully drainable, this can be accomplished using the configuration shown in FIG. 6. FIG. 6 shows the locations 193 and 194 of fully drainable end tubes for panels 110 and 102, respectively. Those skilled in the art will readily appreciate that any suitable end tube configuration can be used for panel headers without departing from the spirit and scope of the invention.

Figure 5:
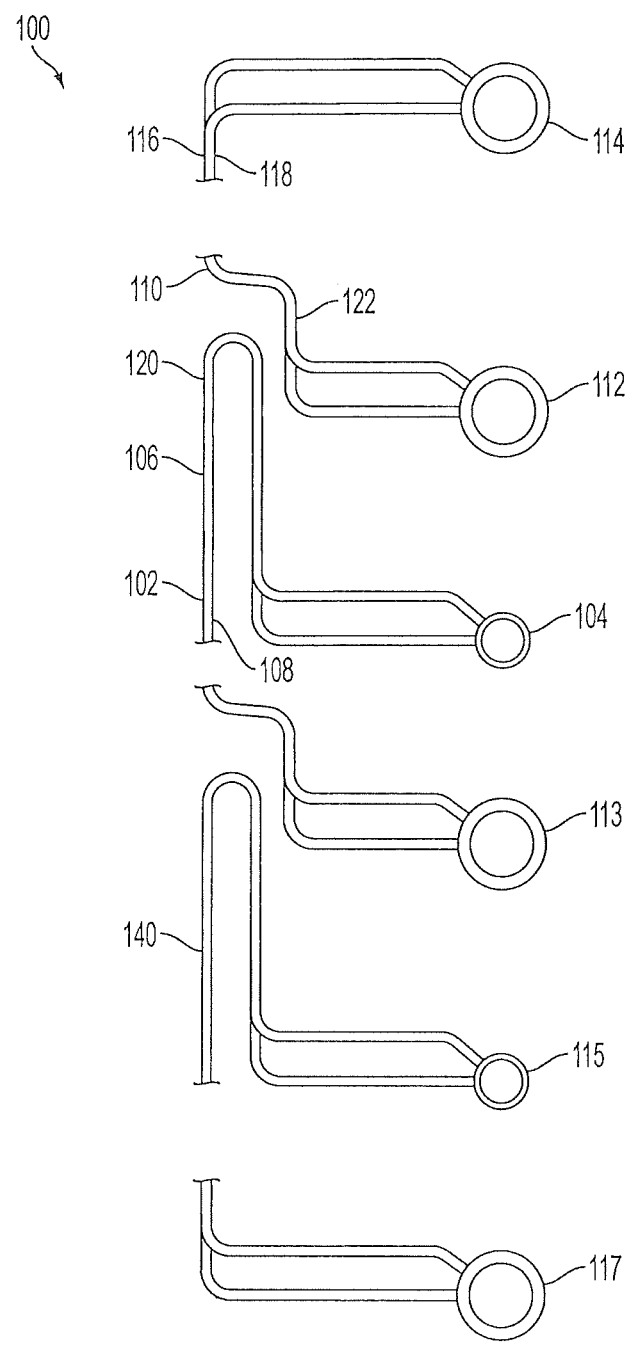
FIG. 5 is a side elevation view of a portion of the boiler of FIG. 2, showing the overlap regions between adjacent superheater, steam generator, and reheater panels.

With reference now to FIG. 5, panel 102 is a steam generator panel and panel 110 is a superheater panel. Boiler 100 also includes reheater panel 140. Each reheater panel 140 includes a plurality of tubes fluidly connecting an inlet header 117 to an outlet header 115, much as described above with respect to panels 102 and 110. Panel 140 overlaps panel 102 in the same manner as panel 102 overlaps panel 110 as described above. It is to be understood that boiler 100 includes multiple, parallel panels of each type, as indicated in FIG. 4. Multiple sets of overlapped panels 102, 110, and 140 can be arranged into a boiler wall, as in FIG. 4. Multiple boiler walls can be joined, for example to form a four-sided or multi-sided boiler capable of receiving concentrated solar energy from heliostats surrounding the base of the boiler. While described herein in the context of a three-stage boiler, those skilled in the art will readily appreciate that any suitable number of stages can be used, and can be arranged in any suitable manner without departing from the spirit and scope of the invention.

The methods and systems of the present invention, as described above and shown in the drawings provide for increased effective area for receiving solar radiation in a boiler, such as in a solar receiver. This configuration provides improved efficiency while also providing protection of components and spaces internal to the receiver panels from leakage of solar radiation from the heliostats, while allowing for thermal expansion and contraction as well as drainability of the boiler sections.

While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
   a) a first boiler panel having a plurality of tubes fluidly connecting an inlet header of the first boiler panel to an outlet header of the first boiler panel, the tubes of the first boiler panel defining a longitudinal tube direction and forming a first solar receiver surface and a first internal surface opposite the first solar receiver surface; and
   b) a second boiler panel having a plurality of tubes fluidly connecting an inlet header of the second boiler panel to an outlet header of the second boiler panel, the tubes of the second boiler panel forming a second solar receiver surface and a second internal surface opposite the second solar receiver surface, wherein the first and second boiler panels are adjacent one another with a portion of the tubes of the first boiler panel at an end of the first solar receiver surface overlapping the tubes of the second boiler panel at an end of the second boiler panel in the longitudinal tube direction to reduce solar radiation passing between the first and second solar receiver surfaces.

2. A boiler for a solar receiver as recited in claim 1, wherein the first and second boiler panels are adjacent to one another with an end of the first solar receiver surface overlapping an end of the second boiler panel so as to cover at least one of the headers behind the first solar receiver surface.

3. A boiler for a solar receiver as recited in claim 1, wherein the first and second boiler panels are adjacent to one another with an end of the first solar receiver surface overlapping an end of the second boiler panel so as to cover one of the headers of each boiler panel behind the first solar receiver surface.

4. A boiler for a solar receiver as recited in claim 1, wherein the first and second internal surfaces are covered with an insulation layer.

5. A boiler for a solar receiver as recited in claim 1, wherein a gap is provided between the end of the second boiler panel and the portion of the first boiler panel overlapping the end of the second boiler panel to accommodate relative movement of the first and second boiler panels due to thermal growth.

6. A boiler for a solar receiver as recited in claim 1, wherein the tubes of the first and second panels are configured and adapted to be fully drainable by way of at least one header in each panel.

7. A boiler for a solar receiver comprising:
   a) a steam generator panel having a plurality of tubes fluidly connecting an inlet header and an outlet header of the steam generator panel, the tubes of the steam generator panel defining a longitudinal tube direction and forming a solar receiver surface and opposed internal surface;
   b) a superheater panel having a plurality of tubes fluidly connecting an inlet header and an outlet header of the superheater panel, the tubes of the superheater panel forming a solar receiver surface and opposed internal surface, wherein the steam generator and superheater panels are adjacent one another with a portion of the tubes of the steam generator panel at an end of the solar receiver surface thereof overlapping the tubes of the superheater panel at an end of the superheater panel in the longitudinal tube direction to reduce solar radiation passing between the solar receiver surfaces of the steam generator and superheater panels; and
   c) a reheater panel having a plurality of tubes fluidly connecting an inlet header and an outlet header of the reheater panel, the tubes of the reheater panel forming a solar receiver surface and opposed internal surface, wherein the steam generator and reheater panels are adjacent one another with a portion of the tubes of the reheater panel at an end of the solar receiver surface thereof overlapping the tubes of the steam generator panel at an end of the steam generator panel in the longitudinal tube direction to reduce solar radiation passing between the solar receiver surfaces of the steam generator and reheater panels.

8. A boiler for a solar receiver as recited in claim 7, wherein the steam generator and superheater panels are adjacent one another with an end of the solar receiver surface of the steam generator panel overlapping an end of the superheater panel so as to cover one header of each of the steam generator and superheater panels behind the solar receiver surface of the steam generator panel, and wherein the steam generator and reheater panels are adjacent one another with an end of the solar receiver surface of the reheater panel overlapping an end of the steam generator panel so as to cover one header of each of the steam generator and reheater panels behind the solar receiver surface of the reheater panel.

9. A boiler for a solar receiver as recited in claim 7, wherein the internal surfaces of the steam generator, superheater, and reheater panels are covered with an insulation layer.

10. A boiler for a solar receiver as recited in claim 7, wherein a first labyrinthine gap is provided between the end of the superheater panel and the portion of the steam generator panel overlapping the end of the superheater panel to accommodate relative movement of the steam generator and superheater panels due to thermal growth, and wherein a second labyrinthine gap is provided between the end of the steam generator panel and the portion of the reheater panel overlapping the end of the steam generator panel to accommodate relative movement of the steam generator and reheater panels due to thermal growth.

11. A boiler for a solar receiver as recited in claim 7, wherein the tubes of the steam generator, superheater, and reheater panels are configured and adapted to be fully drainable by way of at least one header in each panel.

12. A boiler for a solar receiver comprising:
a) a first boiler panel having a plurality of tubes fluidly connecting an inlet header of the first boiler panel to an outlet header of the first boiler panel, the tubes of the first boiler panel defining a longitudinal tube direction and forming a first solar receiver surface and a first internal surface opposite the first solar receiver surface; and
b) a second boiler panel having a plurality of tubes fluidly connecting an inlet header of the second boiler panel to an outlet header of the second boiler panel, the tubes of the second boiler panel forming a second solar receiver surface and a second internal surface opposite the second solar receiver surface, wherein the first and second boiler panels are adjacent one another with a portion of the tubes of the first boiler panel at an end of the first solar receiver surface overlapping the tubes of the second boiler panel at an end of the second boiler panel in the longitudinal tube direction and covering one header of each of the first and second boiler panels, and wherein a labyrinthine gap is provided between the end of the first solar receiver surface and the end of the second boiler panel to accommodate relative movement of the first and second boiler panels due to thermal growth.

13. A boiler for a solar receiver as recited in claim 12, wherein the tubes of the first and second panels are configured and adapted to be fully drainable by way of at least one header in each panel.

14. A boiler for a solar receiver as recited in claim 12, wherein the portion of the first solar receiver panel overlapping the end of the second boiler panel includes a 180° bend in the uppermost end of the plurality of tubes of the first solar receiving panel.

* * * * *